United States Patent [19]

Sugiyama

[11] Patent Number: 5,361,309

[45] Date of Patent: Nov. 1, 1994

[54] CHARACTER RECOGNITION APPARATUS AND METHOD WITH LOW-RESOLUTION STORAGE FOR CHARACTER EXTRACTION

[75] Inventor: Mitsumasa Sugiyama, Yokohama, Japan

[73] Assignee: Canon Kabushiki Kaisha, Tokyo, Japan

[21] Appl. No.: 173,861

[22] Filed: Dec. 23, 1993

Related U.S. Application Data

[63] Continuation of Ser. No. 882,764, May 11, 1992, abandoned, which is a continuation of Ser. No. 575,679, Aug. 31, 1990, abandoned.

[30] Foreign Application Priority Data

Sep. 7, 1989 [JP] Japan .................. 1-230415

[51] Int. Cl.⁵ ............................................. G06K 9/20
[52] U.S. Cl. ............................................ 382/9; 382/47; 382/48
[58] Field of Search ............... 382/9, 63, 38, 48, 18, 382/62, 47, 56

[56] References Cited

U.S. PATENT DOCUMENTS

| | | | |
|---|---|---|---|
| 4,200,861 | 4/1980 | Hubach et al. | 340/146.3 Q |
| 4,461,027 | 7/1984 | Ikeda et al. | 382/9 |
| 4,516,265 | 5/1985 | Kizu et al. | 382/48 |
| 4,589,140 | 5/1986 | Bishop et al. | 382/8 |
| 4,850,025 | 7/1989 | Abe | 382/9 |
| 4,903,311 | 2/1990 | Nakamura | 382/9 |
| 4,926,492 | 5/1990 | Tanaka et al. | 382/18 |
| 5,040,223 | 8/1991 | Kamiya et al. | 382/4 |

FOREIGN PATENT DOCUMENTS

| | | | |
|---|---|---|---|
| 2245001 | 4/1973 | Germany | 382/63 |
| 0298887 | 12/1987 | Japan | 382/48 |

*Primary Examiner*—David K. Moore
*Assistant Examiner*—Andrew W. Johns
*Attorney, Agent, or Firm*—Fitzpatrick, Cella, Harper & Scinto

[57] ABSTRACT

A character recognizer includes a memory for storing low resolution data of a group of characters to be recognized in an image and a memory for storing high resolution data of the group of characters. Wide range image data for the characters stored in the high resolution memory is selected on the basis of narrower range image data for corresponding characters stored in the low resolution memory. Character recognition is performed according to the selected character image data.

12 Claims, 2 Drawing Sheets

CHARACTER RECOGNITION APPARATUS AND METHOD WITH LOW-RESOLUTION STORAGE FOR CHARACTER EXTRACTION

This application is a continuation of application Ser. No. 07/882,764 filed May 11, 1992, now abandoned, which is a continuation of application Ser. No. 07/575,679 filed Aug. 31, 1990, abandoned.

BACKGROUND OF THE INVENTION

1. Field of the Invention

The present invention relates to character recognition, and more particularly, to character recognition apparatus which selects character image data for a character and recognizes the character from the selected data.

2. Description of the Prior Art

Conventionally, apparatus which optically reads a document image and recognizes characters in the document image is known.

In general, since many characters are included in a document image which is a recognition object, it is necessary to first perform a process that selects individual characters (detects an area where one character exists) in order to recognize a character.

Then, a character recognition operation is performed based on the selected image data for one character.

It is preferable that the number of dots constituting the selected character be as large as possible in order to enhance the recognition rate. In other words, if the recognition process is performed by reading a document image with a scanner or the like, it is better to use a high resolution scanner.

However, on the other hand, higher resolution requires more time for the character selection process and the character recognition process.

SUMMARY OF THE INVENTION

With such a problem in view, the present invention provides a character recognition apparatus which shortens the whole process time required for the character recognition by performing at least the character selection process at high speed.

A character recognition apparatus according to the present invention comprises a first memory means for storing low-resolution data of an image for a group of recognition object characters, a second memory means for storing high-resolution data of the image of the group of recognition object characters, and a character selection means for selecting image data for corresponding characters stored in the second memory means based on the position of image data for individual characters stored in the first memory means, and performs a character recognition process based on the character image data selected by the character selection means.

Furthermore, the selection means of the present invention selects data of a wider range than the corresponding position of the image data stored in the first memory means.

According to the present invention, the speed of the process can be increased by selecting the recognition object characters based on the high-resolution data after detecting the position of the recognition object character based on the low-resolution data.

According to the present invention, selection of necessary data for the character recognition process can be improved by selecting from the wider range high-resolution image data the low-resolution data used to detect the position of the recognition object character.

DESCRIPTION OF THE PREFERRED EMBODIMENTS

The embodiments of the present invention will now be described in detail with reference to the accompanying drawings.

Figure 1:
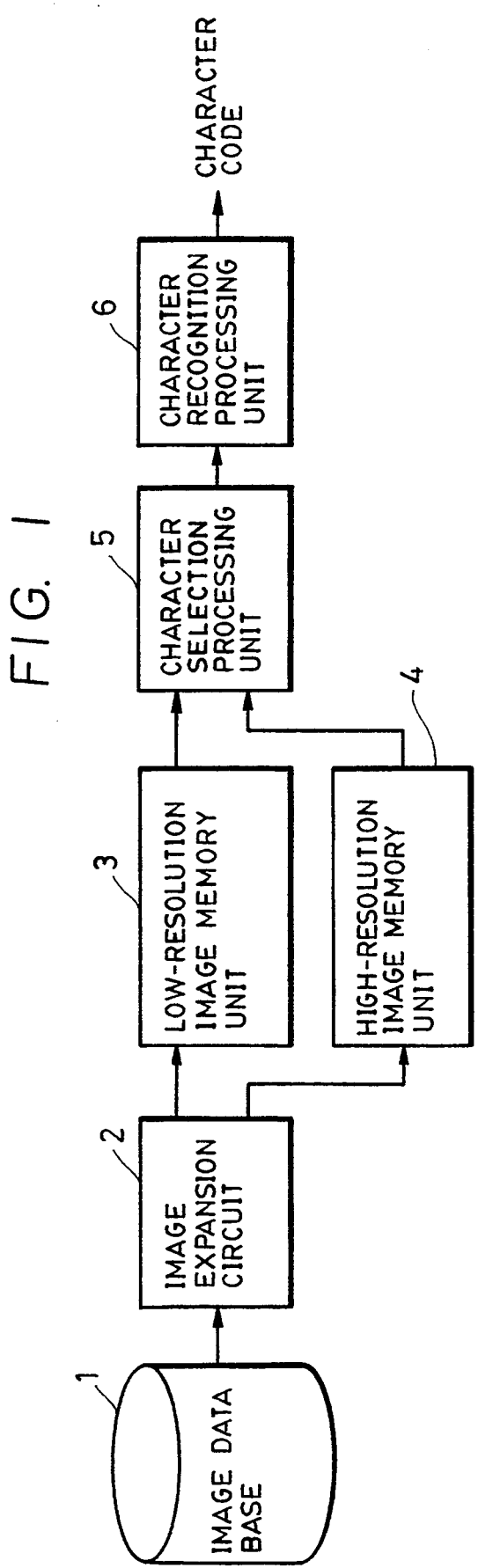
FIG. 1 is a block diagram of an embodiment of a character recognition apparatus.

FIG. 1 is a block diagram of an embodiment of a character recognition apparatus.

In the Fig., 1 is an image data base for storing a document image (a document image written in lateral lines in the embodiment), 2 is an image expansion circuit, 3 is a low-resolution image memory unit, 4 is a high-resolution image memory unit, 5 is a character selection processing unit, and 6 is a character recognition processing unit. The low-resolution image memory unit 3 and the high-resolution image memory unit 4, respectively, each comprising a RAM having a capacity capable of storing one page of an image document with the corresponding resolution. The specific circuits in the block diagram of FIG. 1 are not critical and are well known to those skilled in the art.

A hierarchically compressed image is stored in the image data base 1 and can be expanded by steps from a low-resolution image to a high-resolution image by the image expansion circuit 2. In the embodiment, image data having the resolution of 50 dpi, 100 dpi, 200 dpi and 400 dpi can be obtained. The image expansion circuit 2 receives image data from the image data base 1, expands the image data, stores image data having the resolution of 50 dpi in the low-resolution image memory unit 3 and stores image data having the resolution of 400 dpi in the high-resolution image memory unit 4.

After the image data is expanded and stored in the low-resolution image memory unit 3 and the high-resolution image memory unit 4, the character selection processing unit 5 detects the position of each character.

Specifically, the document image expanded in the low resolution image memory unit 3 is laterally scanned so as to detect the frequency of black dots. Then, the position of each line (longitudinal coordinate position) is detected by taking the distribution of black dots which are displaced in the longitudinal (Y) direction. The detected coordinate position comprises coordinates from the upper and lower sides of each line in which characters are laterally arranged.

After detection of the longitudinal coordinate position, the lateral coordinate position of each character in a noted line is detected. The detection is performed in the same manner as the previous detection of the line. In other words, the longitudinal frequency of black dots in the detected line and the distribution of the black dots which are displaced in the lateral (X) direction are detected. The range between the position where the appearance of black dots is detected and the position where the absence of the black dots is detected (that is, the character width) is determined as a lateral coordinate position of the character.

Thus, the coordinate positions of the upper left point and the lower right point of each character in the low-resolution image memory unit 3 are found.

Figure 3:
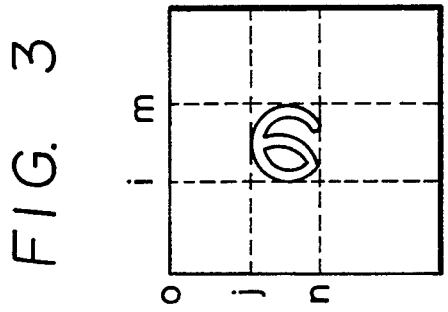
FIG. 3 is a view showing the relationship between a character and a character position.

As shown in FIG. 3, since the upper left point of a Japanese character " " is on the "i"th pixel to the right and the "j"th line downward, its coordinate position is (i, j), and since the lower right point thereof is on the "m"th pixel and the "n"th line, its coordinate position is (m, n).

After detecting the coordinate positions of the upper left point and the lower right point of the detected character image stored in the low-resolution image memory unit 3, the character selection processing unit 5 calculates the coordinate positions of the upper left point and the lower right point of a character image stored in the high-resolution image memory unit 4 corresponding to the above detected character image.

As described above, in the case of the embodiment, an image of 50 dpi is stored in the low-resolution image memory unit 3 and the image having eight times the resolution of the above, i.e., 400 dpi is stored in the high-resolution image memory unit 4. In short, the high-resolution image memory unit 4 is laterally and longitudinally eight times as larger than the low-resolution image memory unit 3.

Therefore, the coordinate position of the upper left point of the correspondent character image in the high-resolution image memory 4 is (8i, 8j), and the coordinate position of the lower right point is (8m, 8n). However, in the embodiment, the selected position of the high-resolution image data is larger by "k" up and down and right and left than the selected position of the low-resolution image data, and the coordinate position of the upper left point in the high-resolution image memory unit 4 is (8i−k, 8j−k) and the coordinate position of the lower right point is (8m+k, 8n+k) so that the high-resolution image data certainly includes the selected position in the low-resolution image data. An appropriate value for "k" is within the range 0 to 7.

The character selection processing unit 5 selects an image in a rectangular area defined by the coordinate positions in the high-resolution image memory unit 4, and delivers the image to the character recognition processing unit 6. As a result, the character recognition processing unit 6 executes the recognition process of the character image selected from the high-resolution image memory unit 4 and generates a character code as a result of the recognition.

Figure 2:
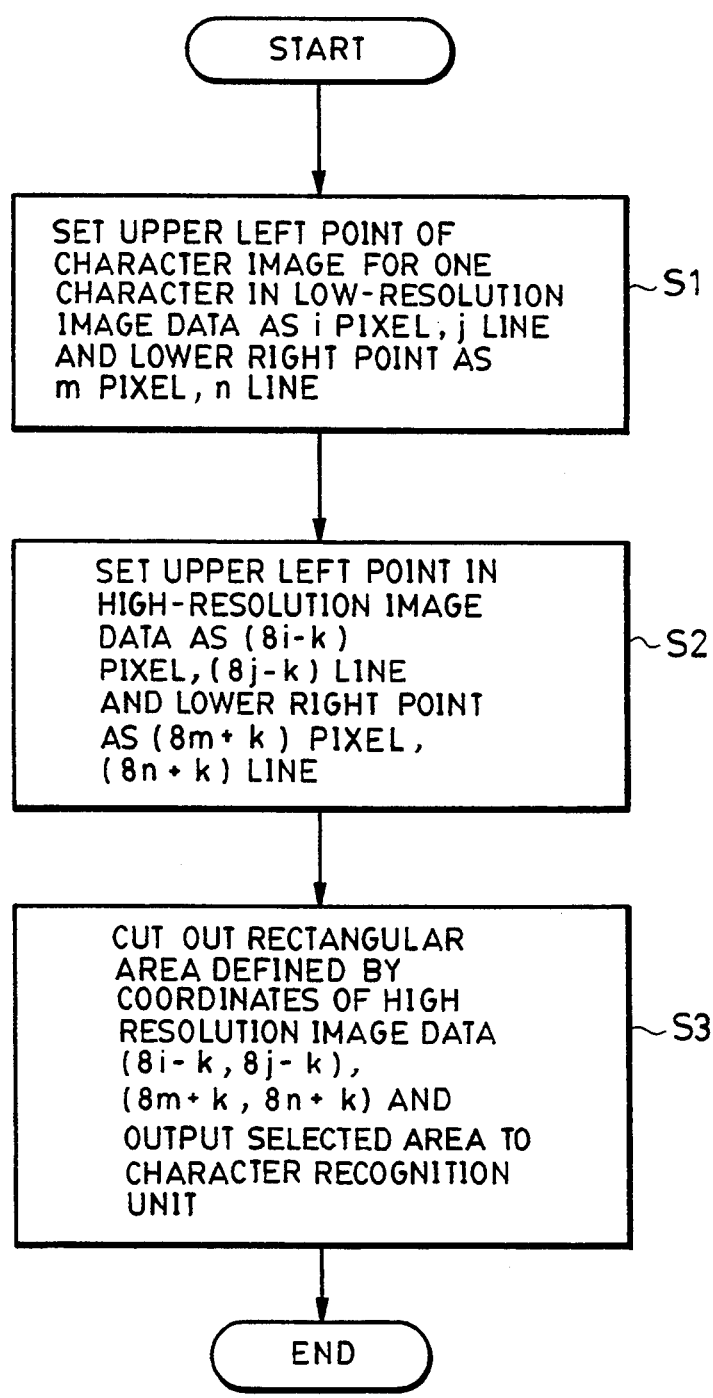
FIG. 2 is a flowchart showing the operation of a character selection processing unit.

FIG. 2 is a flowchart relative to the detection of the character position and forms a part of the process of the character selection processing unit 5.

First, in Step S1, the upper left point of a character image for one character in the low-resolution image data (stored in the low-resolution image memory unit 3) is set as "i" pixel and "j" line and the lower right point is set as "m" pixel and "n" line. Since pixel data having a resolution of 50 dpi is stored in the low-resolution image memory unit 3 and image data having 8 times the resolution of the above, i.e., 400 dpi is stored in the high-resolution image memory unit 3, in Step S2, the upper left point in the high-resolution image data is set as (8i−k) pixel and (8j−k) line and the lower right point is set as (8m+k) pixel and (8n+k) line.

Then, in the next Step S3, an image in a rectangle defined by the obtained coordinate positions (8i−k, 8j−k) and (8m+k, 8n+k) is selected (read out) from the high-resolution image memory unit 4 and output to the character recognition processing unit 6.

As described above, according to the present embodiment, since the selected character position is detected based on the low-resolution data, the processing time required for the detection can be shortened. Therefore, the whole processing time required for the character recognition can also be shortened.

Though the case in which image data having the resolution of 50 dpi is stored in the low-resolution image memory unit and image data of 400 dpi is stored in the high-resolution image memory unit is described in the above embodiment, it is not necessary that the resolution always be 50 dpi or 400 dpi. For example, image data having a resolution of 100 dpi may be stored in the low-resolution image memory unit. In this case, since the resolution of the high-resolution image data is 4 times the resolution of the image data in the low-resolution image data, the coordinates of the selected character position is (4i−k, 4j−k) and (4m+k, 4n+k). An appropriate value for "k" is within 0 to 3.

Though the image data of 50 dpi, 100 dpi, 200 dpi and 400 dpi are obtained from the image data base 1, image data having another resolution, for example, 75 dpi, 150 dpi, or 300 dpi, may be obtained.

Furthermore, although the recognition object character image is retrieved from the image data base 1 in the embodiment shown, an image input apparatus, such as a scanner, a video camera or the like, may be connected to the character recognition apparatus, and the recognition process may be performed based on an image input from the image input apparatus (or an image stored in an external memory apparatus). However, it is necessary for the image input apparatus to have high-resolution in order to enhance the recognition rate.

For example, if the resolution of the image input apparatus is 400 dpi, the image read by the image input apparatus is delivered directly into the high-resolution image memory unit 4. Then, an image of 50 dpi is generated by generating one pixel data for each 8 pixels of the lateral and longitudinal pixels in the low-resolution image memory unit 3 (by calculating the logical add and the average value of all of the 8 pixels).

Furthermore, although the image data is retrieved from the image data base 1 in the embodiment, apparatus which receives image data through a telephone line, such as a modem, a facsimile or the like, may by connected to the character recognition apparatus. Hierarchically compressed image data may be received, stored in a temporary memory circuit and retrieved from the temporary memory circuit.

Still further, in the above embodiment it is described that the image data base 1 stores the hierarchically compressed image data. However, where hierarchically compressed image data and uncompressed image data are stored together, the hierarchically compressed data may be processed according to the above embodiment and the uncompressed image data may be processed in a conventional method using only the high-resolution image data.

What is claimed is:

1. A character recognition apparatus, comprising:
   first memory means for storing low-resolution image data expanding already stored compressed image data;
   second memory means for storing high-resolution data expanding the already stored compressed image data;

extraction means for extracting an area in which one character exists from the data in said first memory means by detecting a frequency of dot-information of the image data in said first memory means representing black dots;

selecting means for converting coordinate data of the extracted area in the first memory means to coordinate data in the second memory means and selecting from said second memory means the high-resolution data corresponding to the converted coordinate data; and recognition means for recognizing the selected high-resolution data of an image of the selected area in said second memory means corresponding to the area extracted by said extracting means.

2. A character recognition apparatus as claimed in claim 1, wherein said recognition means uses data of a wider range than the corresponding area of said image data stored in said first memory means.

3. A character recognition apparatus according to claim 1, wherein said extracting by said extraction means is performed by counting dot-information of the image data in said first memory in horizontal and vertical directions.

4. A character recognition apparatus according to claim 1, wherein said selecting means selects a larger amended area from the extracted area.

5. A character recognition apparatus according to claim 4, wherein the selected area is amended within a value between 0 and a ratio of the low-resolution to the high-resolution.

6. A character recognition apparatus according to claim 1, further comprising converting means for converting a coordinate value indicating the extracted area to a coordinate value indicating the selected area according to the ratio of the low-resolution to the high-resolution.

7. A character recognition method, comprising the steps of:

storing low-resolution data expanding already stored compressed image data in a first memory;

storing high-resolution data expanding the already stored compressed image data in a second memory;

extracting an area in which one character exists from the low-resolution data by detecting a frequency of dot-information of the image data in the first memory representing black dots;

converting the coordinate data of the extracted area in the first memory to coordinate data in the second memory and selecting from the second memory the high-resolution data corresponding to the converted coordinate data; and recognizing the high-resolution data of an image of the selected area in the second memory.

8. A character recognition method as claimed in claim 7, wherein the step of recognizing image data corresponding to characters comprises selecting image data of a wider range than the corresponding character area of said image data stored in said first memory.

9. A character recognition method according to claim 7, wherein said extracting is performed by counting dot-information of the image data in said first memory in horizontal and vertical directions.

10. A character recognition method according to claim 7, wherein said selecting step selects a larger amended area from the extracted area.

11. A character recognition method according to claim 10, wherein the selected area is amended within a value between 0 and a ratio of the low-resolution to the high-resolution.

12. A character recognition method according to claim 7, further comprising a step for converting a coordinate value indicating the extracted area to a coordinate value indicating the selected area according to the ratio of the low-resolution to the high-resolution.

* * * * *

UNITED STATES PATENT AND TRADEMARK OFFICE
CERTIFICATE OF CORRECTION

PATENT NO. : 5,361,309
DATED : November 1, 1994
INVENTOR(S) : MITSUMASA SUGIYAMA It is certified that error appears in the above-indentified patent and that said Letters Patent is hereby corrected as shown below:

COLUMN 3

Line 5, "character " "" should read --character "Ω "--.
Line 24, "as" should be deleted.

Signed and Sealed this

Twenty-fifth Day of April, 1995

Attest:

BRUCE LEHMAN

Attesting Officer     Commissioner of Patents and Trademarks